United States Patent [19]

Nagasawa

[11] 4,079,712
[45] Mar. 21, 1978

[54] CONTACTLESS CAPACITOR DISCHARGE TYPE IGNITION SYSTEM FOR INTERNAL COMBUSTION ENGINE

[75] Inventor: Masao Nagasawa, Kariya, Japan

[73] Assignee: Nippondenso Co., Ltd., Kariya, Japan

[21] Appl. No.: 646,742

[22] Filed: Jan. 6, 1976

[30] Foreign Application Priority Data

Jan. 31, 1975 Japan .................... 50-13532

[51] Int. Cl.² .......................... F02P 3/06; F02P 1/00; F02P 3/10
[52] U.S. Cl. ............................................. 123/148 CC
[58] Field of Search .......... 123/148 R, 148 D, 148 E, 123/148 DK, 148 DS, 148 ND, 148 CC, 148 MC

[56] References Cited

U.S. PATENT DOCUMENTS

| | | | |
|---|---|---|---|
| 3,699,940 | 10/1972 | Vargas | 123/148 E |
| 3,736,914 | 6/1973 | Schmaldienst et al. | 123/148 E |
| 3,783,850 | 1/1974 | Habert | 123/146.5 A |
| 3,911,889 | 10/1975 | Nagasawa | 123/148 R |
| 3,933,139 | 1/1976 | Beeghly | 123/148 CC |
| 3,955,550 | 5/1976 | Carlsson | 123/149 D |

Primary Examiner—Samuel W. Engle
Assistant Examiner—Thomas H. Webb
Attorney, Agent, or Firm—Cushman, Darby & Cushman

[57] ABSTRACT

In a contactless capacitor discharge type ignition system for an internal combustion engine in which a timing signal coil is connected to a control gate of a switching thyristor for discharging a stored charge on a capacitor, a series circuit is connected across the timing signal coil in order to pass a controlled current in one direction. By the shortcircuit of current flowing through the coil, the output of the timing signal coil of the opposite direction is so influenced as to retard the spark timing, whereby the spark retard can be carried at a relatively high speed operation of an engine.

4 Claims, 14 Drawing Figures

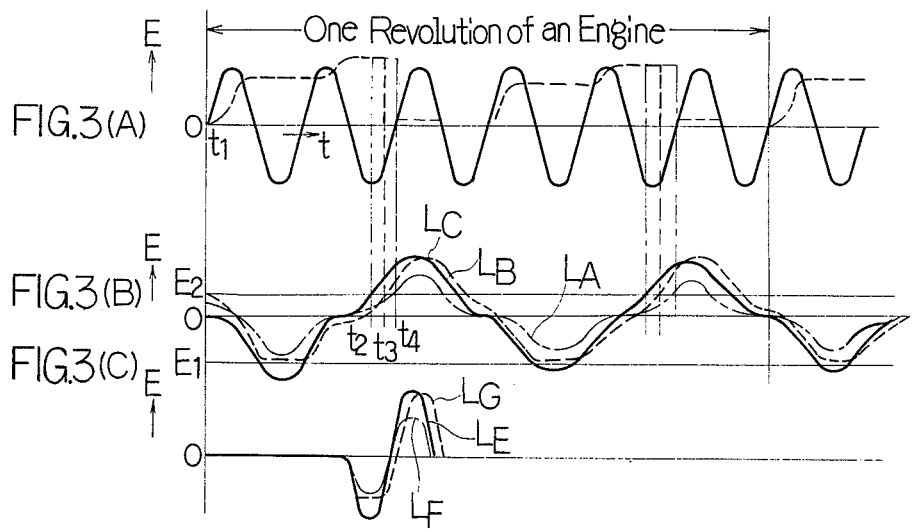
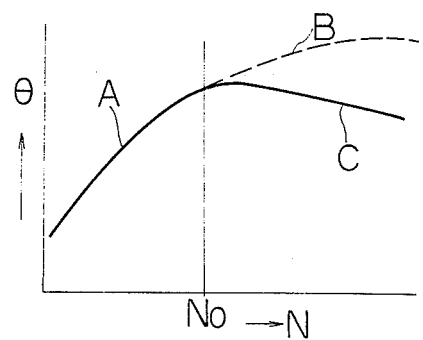
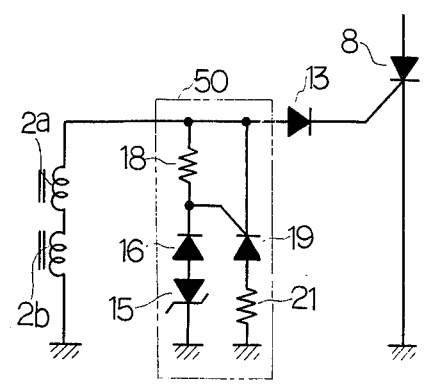
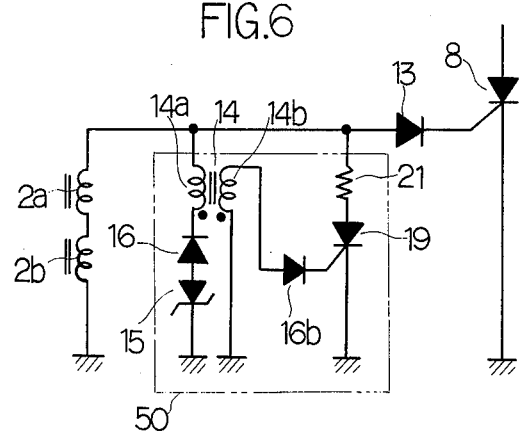

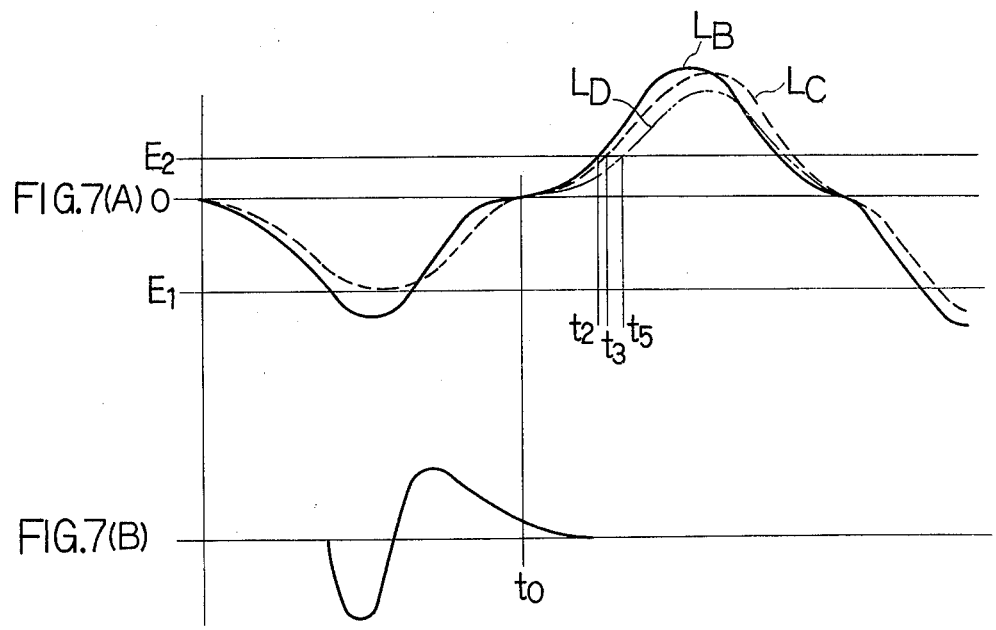
FIG. 7(A)
FIG. 7(B)
FIG. 8
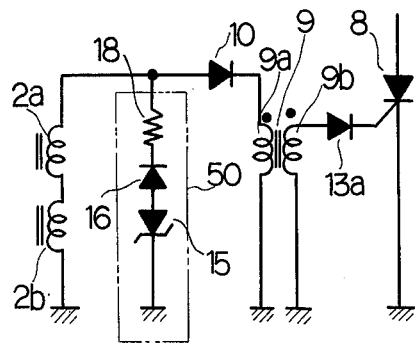
FIG. 10
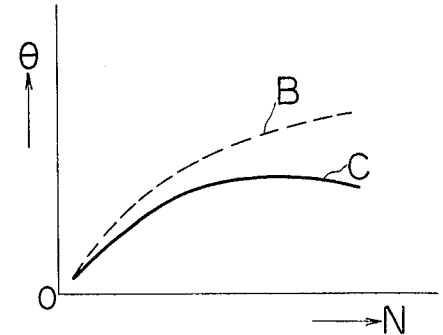
FIG. 9
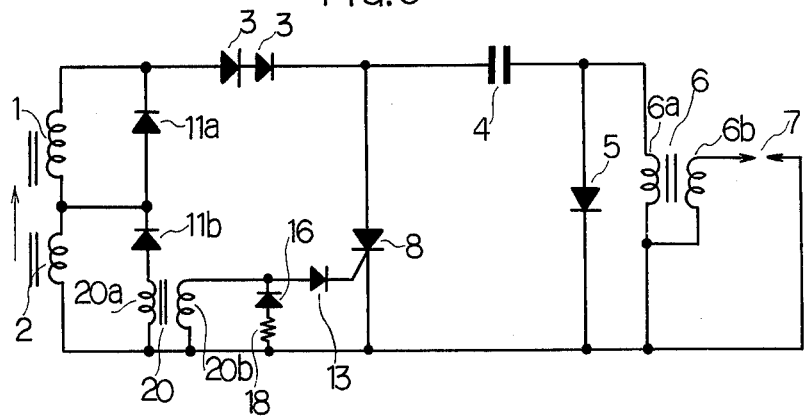

CONTACTLESS CAPACITOR DISCHARGE TYPE IGNITION SYSTEM FOR INTERNAL COMBUSTION ENGINE

BACKGROUND OF THE INVENTION

1. Field of the Invention

The present invention relates to a contactless capacitor discharge type ignition system for an internal combustion engine, especially to a contactless ignition system which permits both spark advance and retard.

2. Description of Prior Art

In a conventional contactless capacitor discharge type ignition system, in which a timing signal is obtained by a transformer connected across a capacitor charging coil using a half wave in a negative derection which is not used for charging a capacitor, as exemplified in U.S. Pat. No. 3,809,043 granted to present inventor, only a spark advance can be carried out.

However, recently an ignition system is required to carry out a spark retard during a relatively high-speed operation of an engine, so that an engine for a motor cycle, especially for a motor cycle used for a motor race, can produce a larger output power more effectively while it is operated at a relatively high-speed. In another aspect, to prevent abnormally high-speed running of an engine, retarding the spark timing is effective.

SUMMARY OF THE INVENTION

It is, therefore, a primary object of the present invention to provide a contactless capacitor discharge type ignition system which can carry out a spark retard at a relatively high-speed operation.

It is another object of the present invention to provide a contactless ignition system which can carry the spark retard by a simple construction.

It is a further object of the present invention to provide a contactless ignition system which enables a free-choice of a spark timing characteristic without requiring an additional timing signal coil.

BRIEF DESCRIPTION OF THE DRAWINGS

FIG. 4 is a diagram showing characteristic curves of a spark timing, FIG. 5 is a partial electric wiring diagram which can be a replacement for that shown in FIG. 1, FIG. 6 is another partial electric wiring diagram for a replacement for that shown in FIG. 1, FIGS. 7 (A) and (B) are waveform diagrams for explaining an operation of the present invention shown in FIG. 6, FIG. 8 is a further partial electric wiring diagram for a replacement for that shwon in FIG. 1, FIG. 9 is a modified electric wiring diagram showing a contactless ignition system, and FIG. 10 is a diagram showing characteristic curves of a spark timing.

DETAILED DESCRIPTION OF PREFERRED EMBODIMENTS

Figure 1:
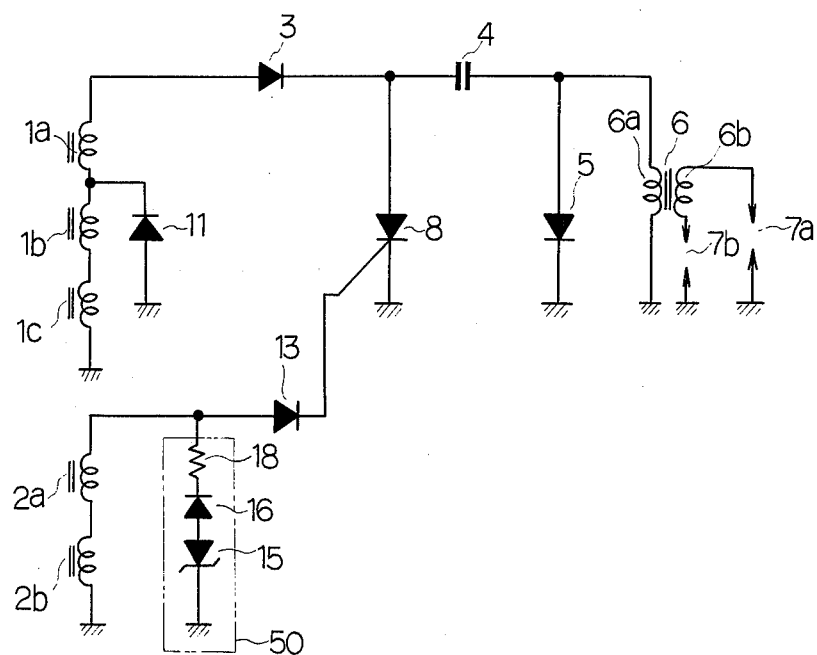
FIG. 1 is an electric wiring diagram of a contactless capacitor discharge type ignition system for an internal combustion engine according to the present invention.

In FIG. 1, capacitor charging coils 1a, 1b and 1c connected in series with each other are mounted in a magneto generator driven by an engine (explained in detail in FIGS. 2A and 2B) for generating alternating current in synchronism with rotation of the engine. Two signal coils 2a and 2b connected in series with each other are also mounted in the magneto generator for generating a timing signal of an alternating current in synchronism with the rotation of the engine.

A diode 3, a capacitor 4 and a diode 5 are series-connected with the capacitor charging coils 1a, 1b and 1c, forming a capacitor charging circuit, in which a half wave of the alternating current generated by the coils 1a, 1b and 1c pass through the diode 3 to be stored in the capacitor 4. A primary winding 6a of an ignition coil 6 is connected in series at its one end with the capacitor 4 and the secondary winding 6b thereof is connected to spark plugs 7a and 7b mounted in the engine.

A thyristor 8 is connected at its anode to a juncture between the diode 3 and the capacitor 4 and at its cathode to the other end of the primary winding 6a.

The capacitor 4, the anode-cathode path of the thyristor 8 and the primary winding 6a form a capacitor discharge circuit when the anode-cathode path is conductive, whereby the charge on the capacitor 4 is discharged therethrough to produce ignition sparks at the spark plugs 7a and 7b.

A control gate of the thyristor 8 is connected to the signal coils 2a and 2b through a diode 13, so that a half wave in one direction of the alternating current at the signal coils 2a and 2b can be supplied to the control gate of the thyristor 8.

A series circuit 50 of a zener diode 15, a diode 16 and a resistor 18 is connected across the signal coils 2a and 2b in such a manner that the half wave in the other direction of the output at the coils 2a and 2b may flow therethrough when the voltage of the half wave across the series circuit 50 exceeds a predetermined value defined by a break-down voltage of the zener diode 15.

A diode 11 is connected across the capacitor charging coils 1b and 1c so that the output at the capacitor charging coil 1a may flow through the diode 11 during a relatively high-speed operation of the engine.

Figure 2A:
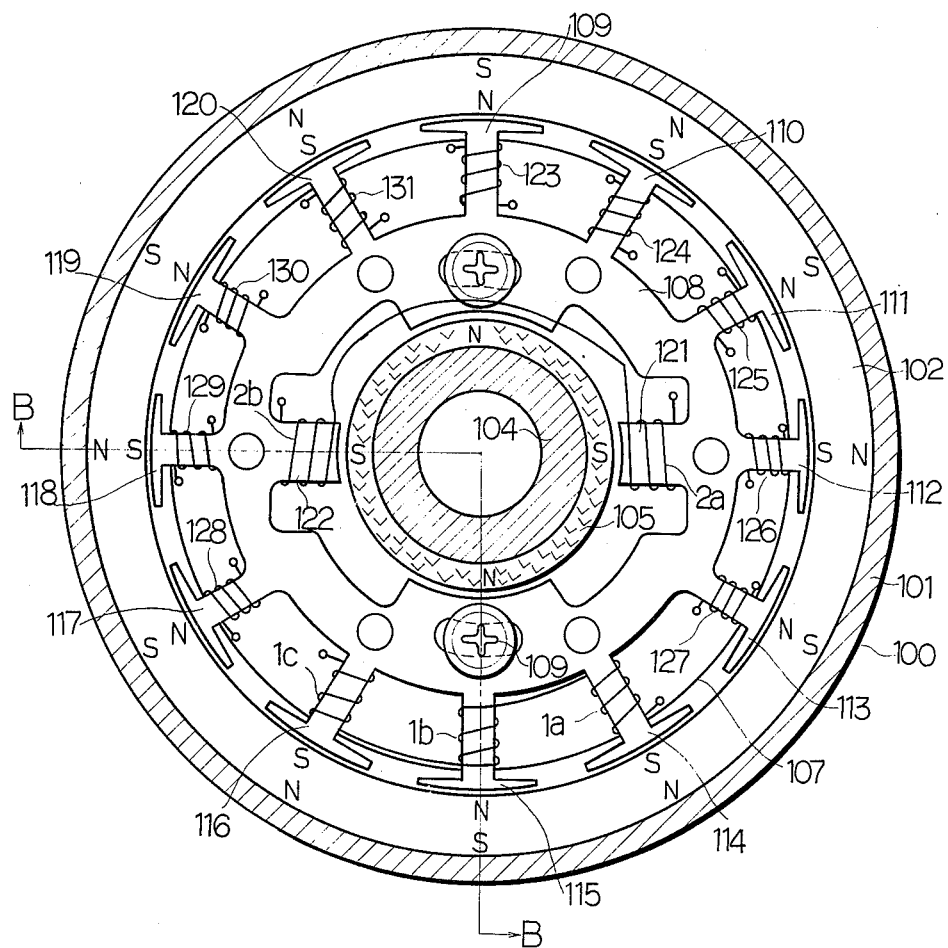
FIG. 2(A) is a transverse sectional view of a magneto generator taken along a line A—A in FIG. 2(B)

The construction of the magneto generator employed in the above explained ignition system will be explained with reference to FIGS. 2(A) and 2(B). Numeral 100 designates a rotor synchronously driven by the engine (not shown), which comprises an iron shell 101, a ring-formed permanent magnet 102 disposed in and fixed to the inside of the iron shell 101 and a center piece 104 securely mounted on a crank shaft at its threaded end (not shown) by means of a nut (not shown). The iron shell 101 is fixed to the center piece 104 by rivets 103. The ring-formed magnet 102 is alternately so polarized as to form 12 poles spaced at equal intervals as shown in FIG. 2(A).

Another ring-formed permanent magnet 105 is disposed on and fixed to the outerside of the cylindrical portion of the center piece 104. The magnet 105 is formed into a trapezoid sectional configuration in elevation as clearly shown in FIG. 2(B) and held by protection rings 106a and 106b disposed at both sides thereof.

Four poles are polarized alternately on the magnet 105 and spaced at equal intervals.

A stator 107 is mounted on the engine by nuts (not shown), on which a stator core 108 is fixed by means of bolts 109. The stator core 108 includes 12 radially-outwardly extending projections 109 to 120 spaced at equal intervals so that the projections face to the poles on the permanent magnet 102. The stator core further includes two projections 121 and 122 radially-inwardly extending on which signal coils 2a and 2b are wound in series.

The capacitor charging coils 1a, 1b and 1c are wound on the projections 114, 115 and 116 and generating coils 123 to 131 for charging a battery or the like are wound on the remaining projections 109 to 113 and 116 to 120.

The capacitor charging coils 1a, 1b and 1c generate in combination six cycles of AC no-load voltage, as shown by a solid line in FIG. 3(A), for each rotation of the magneto generator, i.e., the rotation of the engine. On the other hand, the signal coils 2a and 2b generate two cycles of AC no-load voltage as shown in FIG. 3(B).

In operation, when the output voltage generated at the capacitor charging coils 1a, 1b and 1c begins to increase in one direction (hereinafter referred to as a positive direction and, therefore, the other direction is referred to as a negative direction) at a time $t_1$, the capacitor 4 starts to store the energy as shown by a dotted line in FIG. 3(A) through the diode 3, the capacitor 4 and a parallel circuit of the diode 5 and the primary winding 6a and the ground.

At the same time, the signal coils 2a and 2b generate the output voltage as shown by a one-dot-chain line $L_A$ in FIG. 3(B) while the operational speed of the engine is relatively low. When the voltage defined by the half wave in one direction (hereinafter referred to as the positive direction and therefore, the other direction is referred to as a negative direction) exceeds a predetermined value $E_2$ at a time $t_4$, the anode-cathode path of the thyristor 8 is driven into conduction, whereby the stored charge on the capacitor 4 is discharged through the anode-cathode path of the thyristor 8, the ground and the primary winding 6a of the ignition coil 6. Accordingly, a secondary high voltage is induced at the secondary winding 6b of the ignition coil 6, resulting in an ignition spark at the spark plugs 7a and 7b.

During this relatively low speed operation of the engine, the output voltage of the half wave in the negative direction is below a zener break-down voltage $E_1$, and therefore the half wave in the negative direction has no influence on the spark timing.

However, when the operational speed of the engine increases and the output voltage of the half wave in the negative direction at the signal coils 2a and 2b exceeds the above said zener break-down voltage $E_1$, the zener diode 15 becomes conductive so that the current flows through the signal coils 2a and 2b, the ground, the zener diode 15, the diode 16 and the resistor 18.

As a result, the half wave in the positive direction is retarded in phase with respect to that which would be obtained when the series circuit 50 is removed. More in detail referring to FIG. 3(B), a solid line $L_B$ indicates the output voltage obtained when the series circuit 50 is removed, whereby the ignition spark is caused at a time $t_2$. On the other hand, a dotted line $L_C$ shows the output voltage according to the present invention, whereby the ignition spark is caused at a time $t_3$ which is retarded with respect to the time $t_2$.

Consequently, the spark timing is carried out as shown in FIG. 4. The spark timing is linearly advanced at relatively low engine speed range as shown by a solid line A while it is linearly retarded at relatively high engine speed range as shown by a solid line C. A dotted line B shows a characteristic of the spark timing carried when the series circuit 50 is removed.

As noted from FIG. 4, the higher the operational speed of the engine becomes at relatively high engine speed range, the more the spark timing is retarded depending on the fact that a larger amount of the current in the negative direction flows through the series circuit 50 as the operational speed of the engine increases.

FIG. 5 shows a modification of the series circuit 50, wherein another series circuit of a resistor 21 and an anode-cathode path of a thyristor 19 is connected across the signal coils 2a and 2b and the control gate of the thyristor 19 is connected to the juncture between the diode 16 and the resistor 18.

In operation of the modification in FIG. 5, the thyristor 19 becomes conductive upon conduction of the zener diode 15, so that the whole half wave in the negative direction flows through the series circuit of the resistor 21 and the thyristor 19, whereby the spark timing can be retarded much greater than in the circuit in FIG. 1.

FIG. 6 shows another modification of the present invention, in which a series circuit of a zener diode 15, a diode 16 and a primary winding 14a of a transformer 14 is connected across the signal coils 2a and 2b in parallel with another series circuit of a thyristor 19 and a resistor 21, and a control gate of the thyristor 19 is connected to a secondary winding 14b of the transformer 14 through a diode 16b.

The operation thereof will be explained with reference to FIG. 7. When the output voltage of the negative half wave of the signal coils 2a and 2b exceeds the zener break-down voltage $E_1$, the current in the negative direction flows through the zener diode 15, the diode 16 and the primary winding 14a of the transformer 14, so that the transformer 14 generates an output voltage as shown by a solid line in FIG. 7(B) at the secondary winding 14b, which would be supplied to the control gate of the thyristor 19 to drive the same into conduction. When the thyristor 19 becomes conductive, the current in the positive direction is forced to flow therethrough, whereby the output voltage in the positive direction across the signal coils 2a and 2b, indicated by a two-dot-chain line LD in FIG. 7(A), becomes lower than that indicated by the dotted line LC in FIG. 7(A), obtained when the series circuit of the thyristor 19 and the resistor is removed.

When the output voltage obtained by the conduction of the thyristor 19 exceeds a predetermined value $E_2$ at a time $t_5$, the switching element of the thyristor 8 is driven into conduction to produce an ignition spark at the spark plugs. Thus, the spark timing can be retarded more than in the circuit in FIG. 1.

FIG. 8 shows a further modification of the present invention, in which the positive output voltage of the signal coils 2a and 2b is supplied to the control gate of the switching thyristor 8 through a transformer 9. A primary winding 9a of the transformer 9 is connected across the series connection of the signal coils 2a and 2b through a diode 10 and the secondary winding 9b is connected to the control gate of the switching thyristor 8 through a diode 13a.

Figure 2B:
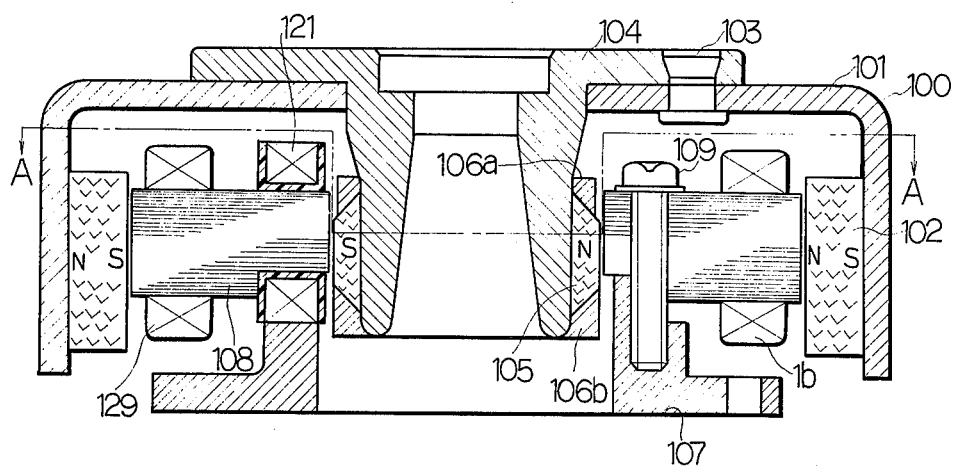
FIG. 2(B) is a longitudinal sectional view of the magneto generator taken along a line B—B in FIG. 2(A), FIGS. 3 (A), (B) and (C) are waveform diagrams for explaining an operation of the present invention.

In the present invention as explained in FIGS. 2(A) and 2(B), the ring-formed magnet 105 is employed so as to generate the continuous AC voltage as shown in FIG. 3(B). However, a magnet which produces a single cycle of AC output voltage as shown in FIG. 3(C), for each rotation of the magneto generator can be employed. It should be noted in FIG. 3(C) that the output voltage starts from the half wave in the negative direction and then the half wave in the positive direction follows sequentially. In FIG. 3(C), a solid line $L_E$ shows the output voltage obtained at relatively high engine speed when the series circuit according to the present invention is not provided. A one-dot-chain line $L_F$ shows the output voltage obtained at relatively low speed range, where the negative half wave gives no influence on the half wave in the positive direction since the half wave in the ngative direction is below the zener break-down voltage. A dotted line $L_G$ shows the output voltage obtained at relatively high engine speed range when the current in the negative direction is forced to flow through a circuit connected across the signal coils 2a and 2b.

FIG. 9 shows a further modification of the present invention and the principal part thereof will be explained hereinafter.

A transformer 20, whose primary winding 20a is connected across the capacitor charging coil 2, is employed for supplying a timing signal instead of the signal generator in FIG. 1 including the signal coils 2a and 2b and the magnet 105. A diode 11b is connected in series to the primary winding 20a so as to allow the current in one direction (negative direction) to flow through the primary winding 20a. A secondary winding 20b of the transformer 20 is connected to the control gate of the switching thyristor 8 through a diode 13. A series circuit of a diode 16 and a resistor 18 is connected across the secondary winding 20b so that the current in the negative direction at the secondary winding 20b is forced to flow therethrough.

In this modification, a zener diode corresponding to same in FIG. 1 is not provided, so that the spark timing is retarded in all range of the operational speed of the engine as shown in FIG. 10, in which a solid line C indicates a characteristic curve of the spark timing according to the present invention and a dotted line B shows a characteristic curve of the spark timing obtained when the series circuit including the diode 16 and the resistor 18 is removed.

What is claimed is:

1. A contactless capacitor discharge type ignition system in combination with an internal combustion engine comprising:
   a magneto generator having a capacitor charging coil for generating alternating current in synchronism with a rotation of an internal combustion engine;
   recitfying means connected in series with said capacitor charging coil for passing the half wave of said alternating current;
   a capacitor connected in series with said rectifying means;
   an ignition coil having a primary winding and a secondary winding, said primary winding being connected in series with said capacitor;
   a spark plug connected to said secondary winding and mounted in said internal combustion engine;
   switching means having a control gate and connected to said capacitor for controlling the discharge of the charge on said capacitor;
   timing signal generating means for generating a timing signal in synchronism with the rotation of said internal combustion engine, said timing signal including a half wave in a negative direction and a half wave in a positive direction following the half wave in the negative direction;
   means for delivering the half wave in the positive direction to said control gate of said switching means to drive the same into conduction, so that the stored charge on said capacitor is discharged through said switching means and said primary winding to produce an ignition spark at said spark plug; and
   control means connected across said timing signal generating means for passing a controlled current in the negative direction through said control means, whereby the half wave in the positive direction is retarded, said control means including a zener diode, a diode and a resistor which are connected in series with each other whereby the spark retard occurs when an operational speed of said internal combustion engine exceeds a predetermined value, and a bypass thyristor connected across said timing signal generating means, the control gate of said bypass thyristor being connected with a juncture between said resistor and said diode.

2. A contactless capacitor discharge type ignition system in combination with an internal combustion engine comprising:
   a magneto generator having a capacitor charging coil for generating alternating current in synchronism with a rotation of an internal combustion engine;
   rectifying means connected in series with said capacitor charging coil for passing the half wave of said alternating current;
   a capacitor connected in series with said rectifying means;
   an ignition coil having a primary winding and a secondary winding, said primary winding being connected in series with said capacitor;
   a spark plug connected to said secondary winding and mounted in said internal combustion engine;
   switching means having a control gate and connected to said capacitor for controlling the discharge of the charge on said capacitor;
   timing signal generating means for generating a timing signal in synchronism with the rotation of said internal combustion engine, said timing signal including a half wave in a negative direction and a half wave in a positive direction following the half wave in the negative direction;
   means for delivering the half wave in the positive direction to said control gate of said switching means to drive the same into conduction, so that the stored charge on said capacitor is discharged through said switching means and said primary winding to produce an ignition spark at said spark plug; and
   control means connected across said timing signal generating means for passing a controlled current in the negative direction through said control means, whereby the half wave in the positive direction is retarded, including: a transformer having a primary coil and a secondary coil; a first series circuit of a zener diode, a diode and said primary coil connected across said timing signal generating means; and a second series circuit of a resistor and a bypass thyristor connected across said timing signal generating means, the control gate of said bypass thyristor being connected to said secondary coil.

3. A contactless capacitor discharge type ignition system in combination with an internal combustion engine comprising;

a capacitor charging coil connected to a magneto generator driven by said internal combustion engine for generating alternating current in synchronism with a rotation of said internal combustion engine, said alternating current having a positive half wave and a negative half wave, a capacitor connected in series with said capacitor charging coil for storing said positive half wave;

an ignition coil having a primary winding and a secondary winding, said primary winding being connected in series with said capacitor;

a spark plug connected in series with said secondary winding and mounted in said internal combustion engine;

switching means having a control gate and connected to said capacitor for controlling the discharge of the charge on said capacitor;

a transformer having a primary coil and a secondary coil, said primary coil being connected across said capacitor charging coil through rectifying means whereby said negative half wave flows through said primary winding;

said secondary coil being connected to said control gate of said switching means and generating a timing signal having a half wave in positive direction and a half wave in a negative direction, said half wave in the positive direction following said half wave in the negative direction;

timing signal supplying means for supplying said half wave in the positive direction to said control gate of said switching means to drive the same into conduction, whereby the stored charge on said capacitor is discharged through said switching means and said primary winding to produce an ignition spark at said spark plug; and control means connected across said secondary coil for short circuiting said secondary coil whereby the half wave in the positive direction is retarded in phase.

4. A contactless capacitor discharge type ignition system in combination with an internal combustion engine comprising;

a magneto generator including a stator, a rotor rotated in synchronism with rotation of an internal combustion engine, a magnet mounted on said rotor and having a plurality of magnetic poles symmetrically disposed about said rotor for rotation therewith, a trigger magnet mounted on said rotor and rotated in synchronism with the rotation of said internal combustion engine;

capacitor charging coil means mounted on said stator adjacent said rotor for generating alternating current in synchronism with the rotation of said internal combustion engine in response to passage of said plurality of magnetic poles past said capacitor charging coil means;

capacitor means connected in series with said capacitor charging coil means for storing said alternating current;

switching means having a control gate and connected to said capacitor means for controlling the discharge of the charge on said capacitor;

an ignition coil having a primary winding connected in series with said capacitor means and said switching means and a secondary winding;

a spark plug connected to said secondary winding;

trigger coil means mounted on said stator adjacent said trigger magnet for generating a timing signal in response to passage of said trigger magnet past said trigger coil means, said timing signal having a positive half wave and a negative half wave generated prior to said positive half wave;

ignition signal supplying means for supplying an ignition signal, when said positive half wave is generated, to said control gate of said switching means to drive the same into conduction, whereby the stored charge on said capacitor means is discharged through said primary winding to produce an ignition spark at said spark plug; and control means connected across said trigger coil means for passing said negative half wave through said control means, whereby the positive half wave is so affected as to retard a spark timing by the current flow by said negative half wave.

* * * * *